(12) United States Patent
Maruno

(10) Patent No.: US 7,158,906 B2
(45) Date of Patent: Jan. 2, 2007

(54) TEST METHOD, TEST SYSTEM, AND PROGRAM THEREFOR

(75) Inventor: Koji Maruno, Kawasaki (JP)

(73) Assignee: NEC Electronics Corporation, Kanagawa (JP)

(*) Notice: Subject to any disclaimer, the term of this patent is extended or adjusted under 35 U.S.C. 154(b) by 81 days.

(21) Appl. No.: 10/892,351

(22) Filed: Jul. 16, 2004

(65) Prior Publication Data

US 2005/0038621 A1    Feb. 17, 2005

(30) Foreign Application Priority Data

Jul. 16, 2003    (JP)    ............... 2003-275560

(51) Int. Cl.
*G06F 19/00*    (2006.01)
(52) U.S. Cl. ............... 702/108; 702/119; 702/120; 702/121; 702/122; 702/123; 714/736; 714/737
(58) Field of Classification Search .......... 702/108, 702/119–123; 714/736–737
See application file for complete search history.

(56) References Cited

U.S. PATENT DOCUMENTS

| | | | | |
|---|---|---|---|---|
| 4,692,921 A | * | 9/1987 | Dahbura et al. ............ 714/738 |
| 5,161,115 A | * | 11/1992 | Teshima et al. ............ 702/108 |
| 5,371,683 A | * | 12/1994 | Fukazawa et al. ............ 716/11 |
| 5,450,598 A | * | 9/1995 | Kaplan et al. ............... 715/533 |
| 5,488,573 A | * | 1/1996 | Brown et al. ................ 703/21 |
| 5,539,680 A | * | 7/1996 | Palnitkar et al. ............ 703/13 |
| 5,659,554 A | * | 8/1997 | Okayasu ..................... 714/738 |
| 5,703,885 A | * | 12/1997 | Sun et al. ................... 714/738 |
| 5,751,592 A | * | 5/1998 | Takai et al. ..................... 716/5 |
| 5,828,829 A | * | 10/1998 | Yamauchi et al. ............ 714/38 |
| 5,870,539 A | * | 2/1999 | Schaffer ...................... 714/38 |
| 5,911,041 A | * | 6/1999 | Schaffer ...................... 714/38 |
| 5,933,633 A | * | 8/1999 | Good et al. ................. 717/131 |
| 6,467,078 B1 | * | 10/2002 | Matsuba et al. ............ 717/100 |
| 6,487,513 B1 | * | 11/2002 | Eastvold et al. ............ 702/108 |
| 2005/0154550 A1 | * | 7/2005 | Singh et al. ................ 702/108 |

FOREIGN PATENT DOCUMENTS

| | | |
|---|---|---|
| JP | 10-63532 | 3/1998 |
| JP | 2002-189617 | 7/2002 |

\* cited by examiner

*Primary Examiner*—Marc. S. Hoff
*Assistant Examiner*—Phuong Huynh
(74) *Attorney, Agent, or Firm*—Young & Thompson

(57) ABSTRACT

In a test system, a test method, and a program for use in verifying states in a target, a predetermined state is previously defined as an intermediate state among states which can be taken by the target. On causing a transition to occur in the target from a previous state to a next following state, the transition is caused to occur in the target from a previous state to the intermediate state. Then, the target makes the transition from the intermediate state to the next following state. For this purpose, the test system stores intermediate state transition procedures from the previous state to the intermediate one and a self-state transition procedure from the intermediate state to the next following state.

3 Claims, 5 Drawing Sheets

TEST METHOD, TEST SYSTEM, AND PROGRAM THEREFOR

BACKGROUND OF THE INVENTION

1. Field of the Invention

The present invention relates to a test system for use in testing an electronic device, such as a car audio system.

2. Related Background Art

In general, this type of electronic device is equipped with various units such as CD, cassette tape, MD, and DVD recorders in addition to a tuner. When manufacturing an electronic device including a plurality of units as stated above, it is necessary to execute a test to investigate whether various operations are performed normally in the units before shipment of the electronic device. The electronic device to be tested is hereinafter referred to as a target or a target device.

On testing the target including the plurality of units, it is necessary to test all operations that a user is likely to utilize. Therefore, with an increase of the number of units included in the target, required test items enormously increase. As a practical matter, there is even a case that it takes one month to complete the test.

It is explained here with a simple example. In testing a state where a target is turned off, a previous state of such a turned-off state should be put into a turned-on state in which power supply is given to the target. Similarly, a user may put a cassette tape recorder forming a unit from a playback state into a fast-rewind state or into a fast-forward state or a recording state. Furthermore, the user may stop listening to the cassette tape recorder and then switch the current mode to the CD, MD, DVD or any other mode. Therefore, consideration should be made about the possibility that, if the user switches the unit mode from the cassette tape to the CD, MD, DVD or any other mode, the user may select one of the playback, pause, stop, fast-forward, and fast-rewind functions for each unit to which the operation has been switched.

If the unit has a plurality of functions, it is necessary to test functions by the number of units before and after the switching and by the number of functions of each unit. Therefore, as the number of units included in the target and the number of functions of each unit increase more and more, the functions to be tested drastically increase.

Generally, a target including a plurality of units is tested by executing a program including a description of a test scenario corresponding to functions before and after the selection of each unit using a computer. In this case, each test scenario defines a predetermined state in a function of a unit before the selection as a start condition and a state after the execution as an end state, with a description of a test procedure varying with each test scenario.

Taking this into account, the target is automatically tested by using a computer. In this case, a control automatically progresses from a preceding test scenario to a following test scenario. If, however, the end state of the target according to the preceding test scenario differs from the start state of the target according to the following test scenario, it is necessary to follow a state transition procedure for causing a transition to occur in the target from the end state of the preceding test scenario to the start state of the following test scenario.

An increase of the number of units included in the electronic device and an increase of the functions thereof give rise to an increase of test scenarios and an increase of start states and end states. Particularly, an increase of states before and after a state transition requires a lot of state transition procedures more than the number of test scenarios. Therefore, it takes a time period of one month or so to test the target. Furthermore, if the number of states before and after the state transition changes due to a change in a target function or the like, a large number of state transition procedures should be prepared as well as test scenarios.

Hereinafter, the above test method will be described more specifically by referring to FIG. 9. The illustrated test scenario 1 describes a start state S1, a test procedure, and an end state S2. On the other hand, the test scenario 2 describes a start state S4, a test procedure, and an end state S3. Furthermore, the test scenario 3 describes a start state S2, a test procedure, and an end state S4.

It is assumed here that the test scenarios 1, 2, and 3 are executed in order. After the test scenario 1 is read into a test execution section and the test is executed according to the test procedure, the test scenario 1 is put in the end state S2. Therefore, in order to execute the test scenario 2 in the start state S4 subsequently, a transition procedure for a transition from the state S2 to the state S4 is executed in the test execution section after the execution of the test scenario 1 to cause a transition to the state S4 to occur. The transition to the state S4 brings about a start of the test procedure of the test scenario 2 in the test execution section and executes the test procedure to the end S3 thereof.

Subsequently, a transition procedure is started from the state S3 of the test scenario 2 to the start state S2 of the test scenario 3. Thus, the transition procedure from the end state S3 of the test scenario 2 to the start state S2 of the test scenario 3 is executed in the test execution section and the test of the test scenario 3 is executed according to the test procedure, thereby causing the end state S4.

As stated above, if the test scenarios are executed in series, it is necessary to cause a transition to the start state of the test scenario to be executed next. Therefore, the state transition often requires a different procedure even for the same transition destination if the transition starts from a different source. Accordingly, there is a need for defining a procedure individually according to a state of the transition source and a state of the transition destination. In this manner, as the number of states increases more and more, the number of states of the transition source and the transition destination increases, thereby increasing the number of definitions of the state transition procedure, too.

In addition, this type of target has functions increased by a change in installed devices (units) or by an increase of the devices. As a result, if the number of states for use in the test increases, it is necessary to define transition procedures to new states for all existing states. Furthermore, if the test scenarios are executed in series, it is necessary to prepare a state transition procedure adapted to the end state in which the previous test scenario has been executed and the start state of the next test scenario. Therefore, with a change in the execution order of the sequential execution procedure, the state transition procedure need be changed, too.

In any case, the practically used test method has a disadvantage that it cannot respond flexibly to an increase or a change in units included in a target to be tested.

On the other hand, the Japanese Unexamined Patent Publication No. 2002-189617 (Document D1) discloses an evaluation system and an evaluation method for evaluating a user system equipped with a microcomputer and with implementation of a user program and a real time operating system by using a host computer (a central processing unit). The invention in Document D1 has an advantage of eliminating a necessity for a use of a jig for the evaluation and a particular device such as an ICE.

The Japanese Unexamined Patent Publication No. Hei 10-63532 (patent document 2) discloses a test item generator for generating a test item for a controller whose motion is controlled by a microcomputer. The test item generator disclosed in the patent document 2 has event information transmitted from the controller to the microcomputer, a correspondence table between events and operations containing the event information and contents of operations of the controller so as to correspond to each other, a correspondence table between actions and motions containing action information transmitted from the microcomputer to the controller and contents of motions of the controller so as to correspond to each other, and a state transition table containing the event information and the action information so as to correspond to each other for each state transition.

In this structure, upon extracting event information and action information from the state transition table, a content of the operation and a content of the motion of the controller are converted on the basis of the correspondence table between events and operations and the correspondence table between actions and motions, and a result of the conversion is output as a test item.

According to the test item generator, a test item to be executed when the microcomputer is incorporated in the controller can be adjusted to actual specifications even if there is an inconsistency between the actual specifications of the controller and the design specifications of the program.

In the conventional technologies, however, there is no suggestion of problems caused to occur on an increase in the number of test scenarios with an increase in the number of units in a target, an increase in the number of the state transition procedures, or the like. For example, while Document D1 discloses the system and method for evaluating the user system to be a target, it neither refers to a test scenario in the host computer nor suggest any relation with a test scenario in a case of an increase or a decrease of the units in the target.

Furthermore, Document D2 only discloses an apparatus for generating a test item in a controller incorporating a microcomputer. No disclosure is made about testing the target externally. In addition, Document D2 does not describe any problem that results from an increase in the state transition information.

SUMMARY OF THE INVENTION

It is an object of the present invention to provide a test system capable of preventing an increase in the test scenario generation steps or generation time attendant on a change of functions of a target to be tested and a test method for use in such system.

It is another object of the present invention to provide a program that can be executed by a computer for use in the test system and the test method described above.

According to a first aspect of the present invention, there is provided a test method for verifying a target to be tested by using a computer, wherein, when the target causes a transition to occur from an end state of a first verification to a start state of a second verification, a first transition is carried out for a transition from the end state of the first verification to a predetermined intermediate state and then a second transition is carried out for a transition from the intermediate state to the start state of the second verification.

With this feature, there is provided a storage device for storing an intermediate state transition procedure for defining a procedure for the first transition to the intermediate state and the destination state transition procedure for defining a procedure for the second transition to the start state of the second verification in addition to first and second test scenarios for carrying out the first and second verifications.

According to a second aspect of the present invention, there is provided a test system for verifying a target to be tested by using a computer, comprising: a storage device for storing a plurality of test scenarios for testing states of the target sequentially and a memory for storing an intermediate state transition procedure for a transition from a state of a transition source to an intermediate state and a destination state transition procedure for a transition from the intermediate state to another state. The intermediate state is previously defined among the plurality of states. With this feature, after executing the test scenarios, a central processing unit of the computer executes the intermediate state transition procedure to cause the transition to occur in the target to the intermediate state once and then executes the destination state transition procedure to perform the operation of causing the transition to occur in the target to the state of a transition destination.

According to a third aspect of the present invention, there is provided a computer-readable program for automatically causing a computer to verify a target transiting from a state of a transition source to a state of a transition destination among a plurality of states. A predetermined state is previously defined among the plurality of states as an intermediate state. The program causes the transition to occur from the transition source to the transition destination via the intermediate state. Specifically, the program includes executing an intermediate state transition procedure for causing the transition to occur in the target from the state of the transition source to the intermediate state and executing a destination state transition procedure for causing the transition to occur in the target from the intermediate state to the state of the transition destination.

According to the present invention, for the transition from the state of the transition source to the state of the transition destination, the predetermined intermediate state is previously defined and the target causes a transition to occur from the state of the transition source to the intermediate state once and then it causes the transition to occur from the intermediate state to the state of the transition destination. In this manner, the state transition via the intermediate state reduces the number of definitions of the state transition procedures and enables an easy response to an increase or a decrease in the number of states or other changes. Therefore, the test system of the present invention is capable of easily testing an electronic device having a large number of states to be tested and whose functions may be frequently changed and can cope with a change in the order of executing the test scenarios.

DESCRIPTION OF THE PREFERRED EMBODIMENTS

When verifying (or testing) a control system to be controlled or a target and carrying out a second verification after an end of a first verification, it is necessary to cause the transition to occur in the target from a transition state of the first verification to a conditional state for starting the second verification. In an automatic-verifying device for automatically verifying the target, there are definitions of procedures for transitions from an arbitrary state to another state in order to execute the verifications in series.

In the present invention, a procedure for a state transition from an arbitrary state to another is characterized in that an intermediate state is previously determined for a target and transition procedures from all states of the target to the intermediate state (also denoted, "common intermediate state") are defined so as to achieve the shortest procedure for a transition from a state of transition source to a state of the transition destination.

More specifically, for example, when carrying out a power-off test, the power supply need be previously turned on. Thus, there is generally a prerequisite for a test when carrying out the test (or verification) by executing test scenarios. Each test scenario assumes the prerequisite to be a conditional state for starting the verification. When carrying out the verification, first, a target for the verification is changed in the state to one described as a start state and then the test is started in the test scenario. Each of the test scenarios contains a description of a test procedure whose content is different from those of other test scenarios and a description of a state after executing the test procedure as an end state.

Figure 1:
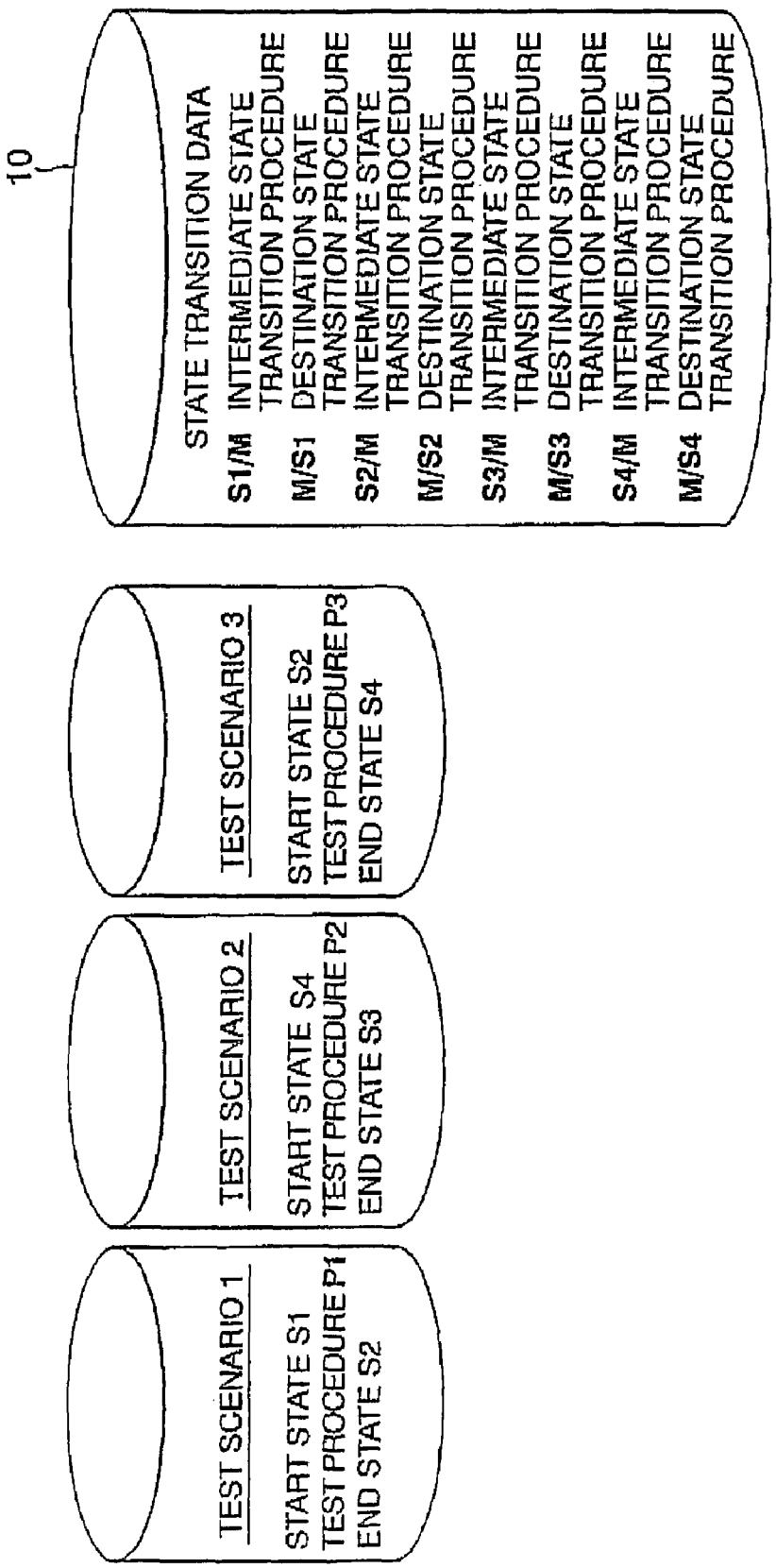
FIG. 1 is a block diagram for explaining a principle of the present invention.

The following describes a principle of the present invention for automatically verifying the target under the above conditions by referring to FIG. 1. It is assumed here that three test scenarios 1, 2, and 3 are executed in this order by using a computer. As shown in FIG. 1, the shown test scenario 1 has a start state S1, a test procedure P1, and an end state S2, the test scenario 2 has a start state S4, a test procedure P2, and an end state S3, and the test scenario 3 has a start state S2, a test procedure P3, and an end state S4. These test scenarios 1 to 3 are stored in a storage device such as a hard disk.

In the present invention, a memory 10 stores an intermediate state transition procedure (S1/M) for a transition from the end state S1 to a predetermined intermediate state M and a destination state transition procedure (M/S1) for a transition from the intermediate state M to the start state S1 in addition to the test scenarios 1 to 3. The destination state transition procedure may be called a self-state transition procedure. In the same manner, the memory 10 stores an intermediate state transition procedure (S2/M) for a transition from the end state S2 to the predetermined intermediate state M and a destination or self-state transition procedure (M/S2) for a transition from the intermediate state M to the start state S2. As stated above, the memory 10 stores the intermediate state transition procedure (S/M) (index omitted) for a transition-from the end state S3 or S4 to the intermediate state M and the destination state transition procedure (M/S) for a transition from the intermediate state M to the start state S for each of the test scenarios. The above intermediate state transition procedure (S/M) and the destination state transition procedure (M/S) are hereinafter collectively referred to as state transition procedure. The memory 10 storing these procedures can be physically arranged separately from a storage device storing the test scenarios 1 to 3 or be the same storage device as for the test scenarios 1 to 3.

The automatic-verifying device for performing the operation based on the principle of the present invention is connected to a target (not shown) such as, for example, a car audio system and the target is verified by testing in this state. In the shown example, the test scenario 1 is read into the central processing unit (CPU), first, and the start state S1 of the test scenario 1 is compared with an initial state. If they are coincident with each other, the test procedure P1 of the test scenario 1 is executed. After an end of the test procedure P1, the target is put in the end state S2 of the test scenario 1.

Subsequently, the end state S2 of the test scenario 1 is compared with the start state S4 of the test scenario 2, Unless they are coincident with each other, the CPU causes the transition to occur to the target from the end state S2 to the predetermined intermediate state M according to the intermediate state transition procedure (S2/M) for the transition from the end state S2 to the intermediate state. The transition from the start state S4 to the intermediate state can be referred to as a first transition while such a procedure may be called a transition original or source procedure. As the intermediate state M, for example, a tuner state can be selected for a car audio system.

In the shown example, it is necessary to carry out a second transition from the intermediate state M to the start state S4 of the test scenario 2. Therefore, the CPU executes the destination state transition procedure (M/S4) for the transition from the intermediate state M to the start state 84 of the test scenario 2, As a result, the target is put in the start state S4 of the test scenario 2.

Subsequently, the CPU verifies the target according to the test procedure 2 of the test scenario 2 and puts the target into the end state S3 after the verification. If the end state S3 differs from the start state S2 of the test scenario 3 executed next, the CPU executes the intermediate state transition procedure (S3/M) for the transition from the end state S3 to the intermediate state M to carry out the first transition to the intermediate state M and then executes the destination state transition procedure (M/S2) for the transition from the intermediate state M to the start state S2 of the test scenario 3.

By the execution of the destination state transition procedure (M/S2), the target is put into the start state 82 of the test scenario 3. In this state, the target is verified according to the test procedure P3 of the test scenario 3. After an end of the verification, the target is put into the end state S4.

In this manner, the test scenarios 1, 2, and 3 are executed in order. Practically, the first transition and the second transition are repeated in the same method, by which a lot of test scenarios are executed and a target is automatically verified according to the number of states of the target.

(First Embodiment)

Figure 2:
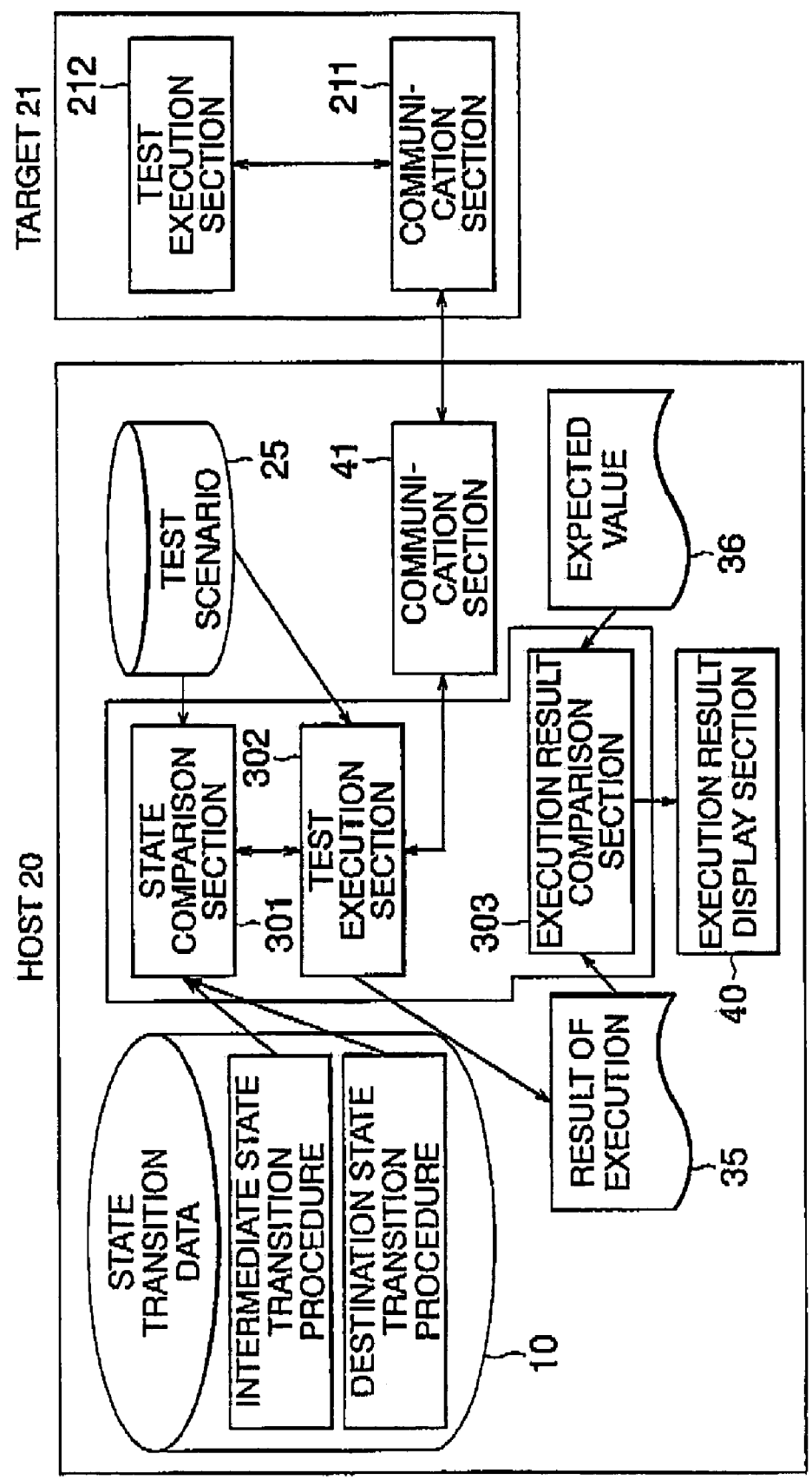
FIG. 2 is a block diagram showing a test system according to an embodiment of the present invention.
Figure 3:
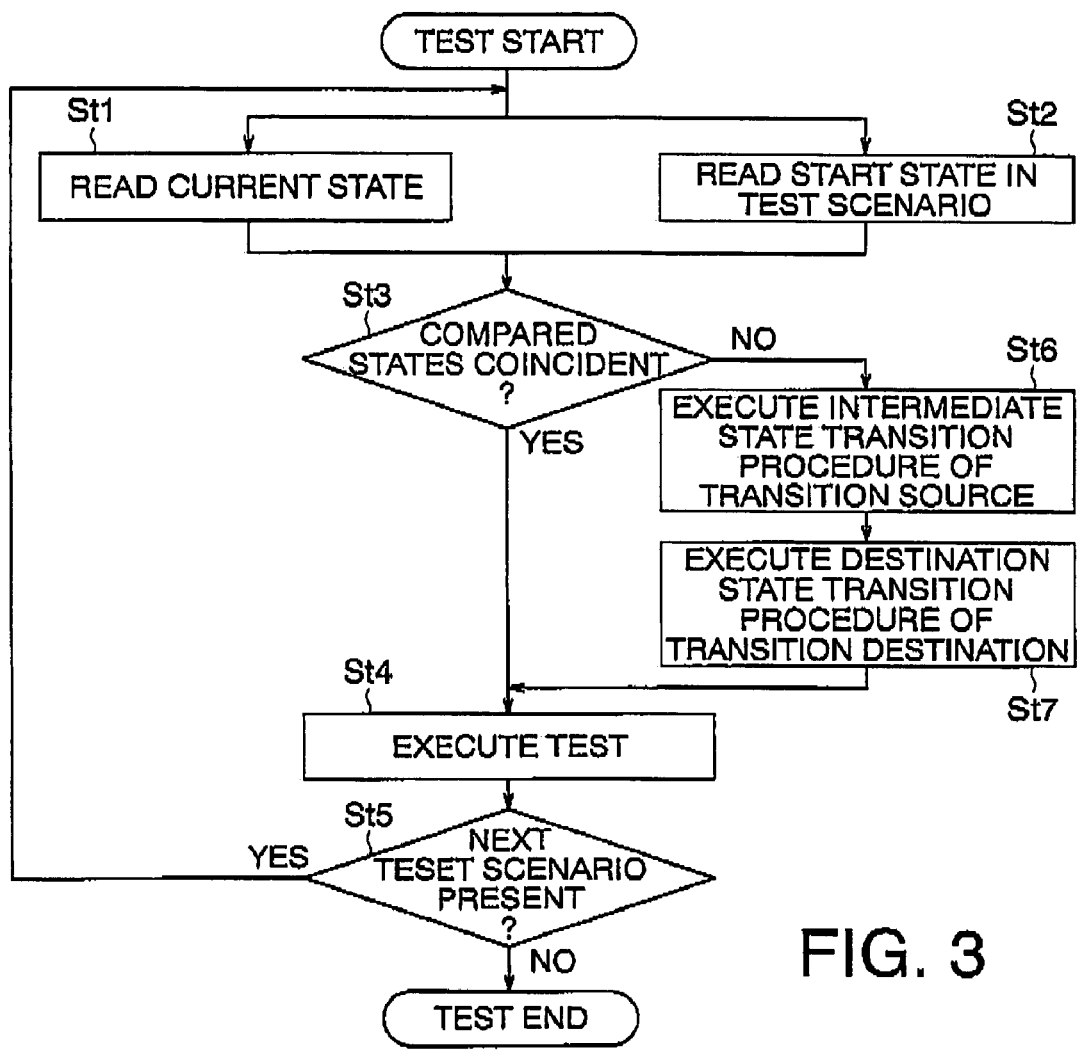
FIG. 3 is a flowchart for explaining operations of the test system shown in FIG. 2.

The following describes the test system specifically according to an embodiment of the present invention by referring to FIG. 2 and FIG. 3 in addition to FIG. 1. Referring to FIG. 2, there is shown a test system according to the embodiment of the present invention. The test system comprises a host computer 20 performing an automatic verification and a target 21 to be verified. The target 21 has a plurality of units such as a tuner and a cassette, MD, CD, or DVD recorder like a car audio system. A user can select units and states thereof arbitrarily by manipulating buttons. As a result of the selection, the target causes a transition to occur from a state (previous state) before the selection to a state (next following state)after the selection. The shown test system is helpful to test and verify all states that the user may select by manipulations or operations. In this embodiment, It is assumed that a state corresponding to the state before the button operation is referred to as an original or previous state of the transition and a state corresponding to the state after the button operation is referred to as a next following or destination state of the transition.

The shown target 21 to be verified has a communication section 211 for transmitting or receiving data from the computer 20 and a test execution section 212 for executing data received in the communication section 211.

On the other hand, the host computer 20 can perform the operations described by referring to FIG. 1. The host computer 20 shown in FIG. 2 has a storage device 25 for storing test scenarios, a memory 10 storing an intermediate state transition procedure, a destination state transition procedure, and other state transition data similarly to the memory 10 shown in FIG. 1, and a CPU 30 for testing and verifying the target 21 according to the test scenarios from the storage device 25 and the state transition data from the memory 10. Furthermore, the illustrated host computer 20 includes memories 35 and 36 such as registers for retaining execution results and expected values, a display unit 40 for displaying the execution results, and a communication section 41 for transmitting or receiving information for a test to or from the target 21.

The shown CPU 30 is characterized by a state comparison section 301, a test execution section 302, and an execution result comparison section 303 corresponding to its operations. In this embodiment, it is assumed that a target to be automatically verified causes a transition to occur from the previous or original state to a single intermediate state M (for example, a tuner state ) from any of all states in which the target can take.

As described with referring to FIG. 1, the memory 10 stores the state transition data defining the intermediate state transition procedure (S/M) and the destination state transition procedure (M/S) for a transition from the intermediate state M to the destination state. On the other hand, the storage device 25 stores test scenarios each defining a test procedure with the start state and the end state in the format shown in FIG. 1.

Referring to FIG. 3, there is shown a program for executing the test according to the present invention. Also referring to the test program shown in FIG. 3, upon a start of the test, the CPU 30 acquires the current or previous state of the target 21 in step St1, while reading a test scenario from the storage device 25 in step St2. The CPU 30 compares the acquired current state with the next state requested in the test scenario (for example, the start state S1 in FIG. 1) by using the state comparison section 301 to detect whether both are coincident with each other (step St3).

If they are coincident, the test procedure in the test scenario is executed by using the test execution section 302 as shown in step St4. After the execution, it is determined whether the next test scenario exists (step St5). The control returns to step St1 to read the current state of the target 21 (step St1) if the next test scenario exists, otherwise the test is terminated.

In the state where the next test scenario exists in step St5 and the control returns to step St1. In this event, when the test scenario is in the end state, the target 21 is also put in the end state of the test scenario.

The end state of the test scenario is compared with the start state of the next text scenario in step St3. As a result, when both are different from each other, the CPU 30 accesses the memory 10 to read the intermediate state transition procedure of the transition source. The procedure is transmitted from the state comparison section 301 to the test execution section 302 and is executed in the test execution section 302 (step St6). As a result, the target 21 causes a transition to occur to the predetermined intermediate state (the tuner state, here).

Subsequently, as shown at step St7 in FIG. 3, the destination state transition procedure of the transition source is read from the memory 10 and then executed in the test execution section 302. A result of the execution is transmitted to the target 21 via the communication section 41, By the execution of the destination state transition procedure (M/S), the target 21 is put into the start state of the next text scenario and in this state the next test scenario is executed by the test execution section 302 (step St4).

In the same manner, the test scenarios are sequentially executed thereafter following the intermediate state transition procedure and the destination state transition procedure, and the test is terminated when the next test scenario does not exist.

On the other hand, a result of the test for the target 21 executed by the test execution section 212 is transmitted to the communication section 41 of the host computer 20 via the communication section 211. Thereafter, it is stored in the memory 35, which retains execution results, via the test execution section 302 from the communication unit 41.

Subsequently, the execution result stored in the memory 35 is saved in the memory 36. It is then compared with the expected value representing the content of the normal execution result of executing the test scenario by using the execution result comparison section 303. A result of the execution result comparison section 303 is displayed on a screen of the execution result display section 40.

The following specifically describes operations of transmitting and receiving data between the state comparison section 301 and the test execution section 302 in the CPU 30 and the communication section 211 and the test execution section 212 in the target 21 by referring to FIG. 2.

The state comparison section 301 transmits a procedure for acquiring the current state (the state of the transition source) to the test execution section 302 in the host computer 20, generates data to be executed in the target 21, and transmits it to the communication section 211 in the target 21 via the communication section 41 in the host computer 20. The test execution section 212 in the target 21 executes the procedure for acquiring the current state and transmits a result of the execution to the host computer 20 via the communication section 211 in the target 21.

The communication section 41 in the host computer 20 receives the data and transmits it to the test execution section 302. The state comparison section 301 receives a result of the execution as the current state from the test execution section 302. The state comparison section compares the received current state with the start state (the state of the transition destination) in the test scenario.

If both differ from each other as a result of the comparison, the intermediate state transition procedure for the state of the transition source of the state transition data is read and a content (data) to be executed in the target 21 is generated in the test execution section 302. The data is then transmitted to the communication section 211 in the target 21 via the communication section 41. The test execution section 212 in the target 21 executes the received data and the target 21 causes a transition to occur to the intermediate state once.

Subsequently, the state comparison section 301 reads the destination state transition procedure for the state of the transition destination and the test execution section 302 generates data to be executed in the target 21 in the same manner. The test execution section. 212 in the target 21 executes it and the target causes a transition to occur to the state of the transition destination, thereby achieving the start state in the test scenario. Thereafter, the test scenarios are sequentially executed in the test execution section 302 in the host computer 20, generated data is transmitted to the target 21 in the same manner, and it is executed in the test execution section 212 in the target 21.

Results of the execution are transmitted from the communication section 211 in the target 21 to the communication section 41 in the host computer 20. The test execution section 302 receives and saves them as results of the execution. They are sequentially compared with expected values in the execution result comparison section 303, and the results are displayed in the execution result display section 40. Thus, the target is automatically verified.

Figure 4:
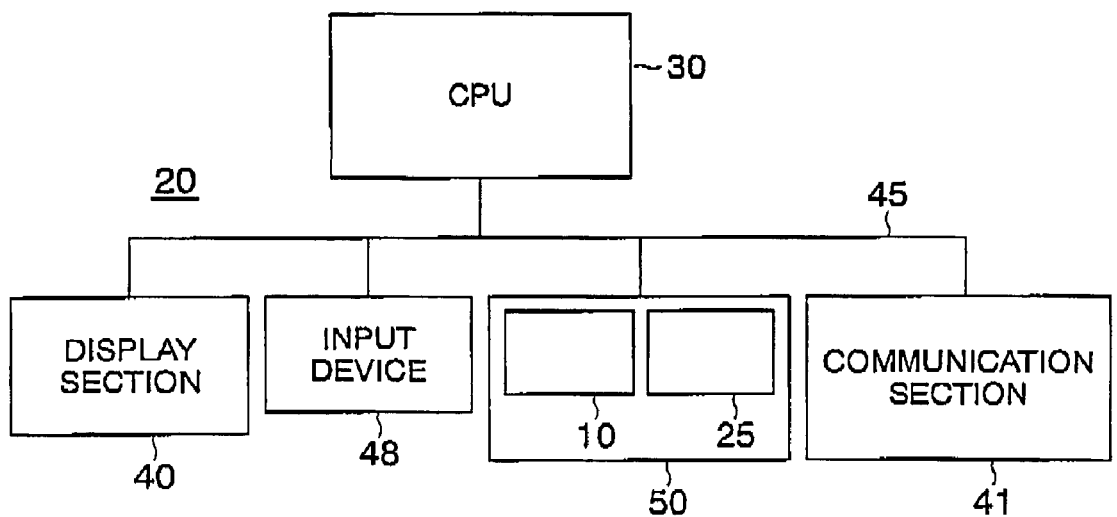
FIG. 4 is a block diagram showing a hardware configuration of a host computer according to the present invention.

Referring to FIG. 4, there is shown a hardware configuration of the host computer 20 shown in FIG. 2. The shown host computer 20 has the CPU 30. The CPU 30 is connected to the communication section 41, the execution result display section 40 formed by a display unit, a main memory 50, and an input device 48 such as a keyboard. In this embodiment, there is shown an example of storing the test scenarios, the intermediate state transition procedure, and the destination state transition procedure in the main memory 50. In FIG. 4, a reference numeral 25 designates a portion where the test scenarios are stored in the main memory 50 and a reference numeral 10 designates a portion where the state transition data is stored in the same. Furthermore, naturally the shown communication section 41 is connected to the communication section 211 in the target 21.

When testing the target 21, the shown CPU 30 reads the test scenarios and the state transition data in the memory 10 and the storage device 25 before automatically verifying the target 21.

Figure 5:
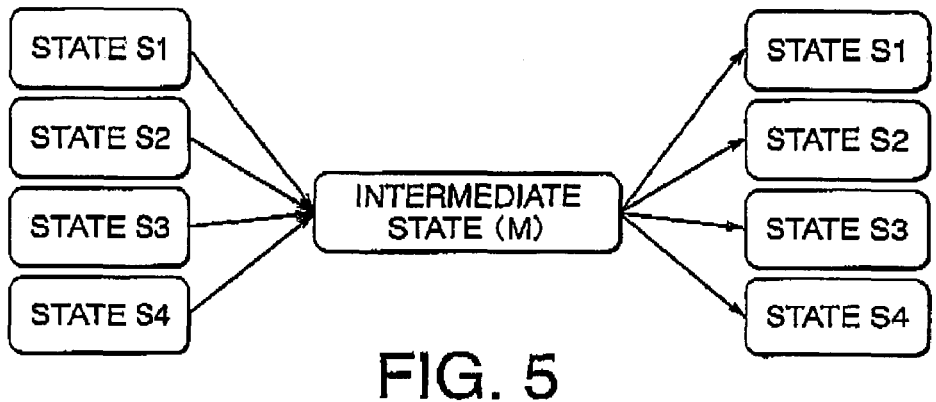
FIG. 5 is a diagram showing a state transition between states among four types of states according to the present invention.

Subsequently, effects of the present invention will be described by referring to FIG. 5 to FIG. 8. First, in FIG. 5, it is assumed that four states S1, S2, S3, and S4 are assumed and a target can cause a transition to occur to any of the states S1 to S4 in the description. In this condition, in the present invention the target causes a transition to occur from one of the states S1 to S4 of the transition source to the intermediate state M and then causes a transition to occur from the intermediate state M to one of the states S1 to S4 of the transition destination as shown in FIG. 5. Therefore, in the present invention, it is necessary to define eight state transition procedures in total including four intermediate state transition procedures for transitions from the states S1 to S4 of the transition source to the intermediate state M and four destination state transition procedures for transitions from the intermediate state M to the states of the transition destination as shown.

If the intermediate state M is provided as stated above, it is possible to cope flexibly with an increase, a decrease, or a change in the number of states. It will now be described by also referring to FIG. 6.

Figure 6:
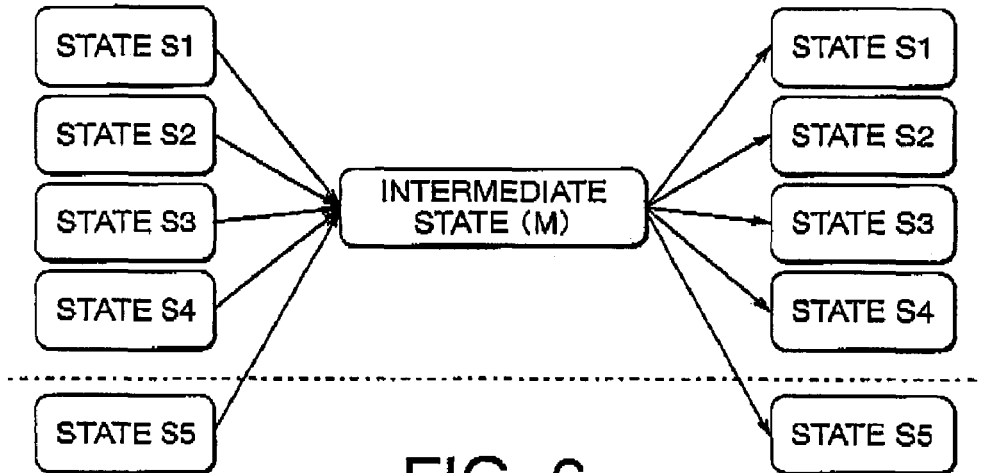
FIG. 6 is a diagram showing a state transition between states among five types of states according to the present invention.

Referring to FIG. 6, there is shown an example of a case where the number of states has increased from four to five. As apparent from FIG. 6, it is possible to cope with an increase in the number of states only by adding two procedures, namely, an intermediate state transition procedure for a transition from a state S5 to the intermediate state M and a destination state transition procedure for a transition from the intermediate state M to the state S5.

To clarify the effect of the present invention, the following describes a case where a state transition is directly carried out from the transition source to the transition destination without using the intermediate state M, as a comparative example.

Figure 7:
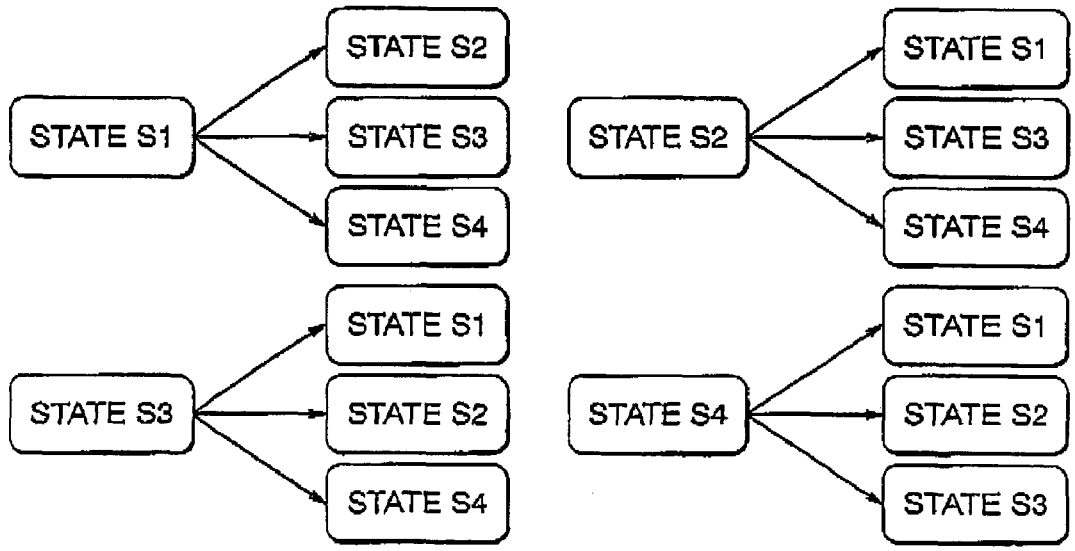
FIG. 7 is a diagram showing a state transition between states among four types of states according to a comparative example.

Referring to FIG. 7, there is shown a case where transitions are carried out among four states in the same manner as in FIG. 5. In other words, it is necessary to define a state transition procedure for a transition from the state S1 to each of other three states S2, S3, and S4 and further to define three state transition procedures for each of the state S2, S3, and S4. As a result, if transitions are directly carried out among four states without intervention of the intermediate state, it is understood that 12 state transition procedures need be defined in total.

Figure 8:
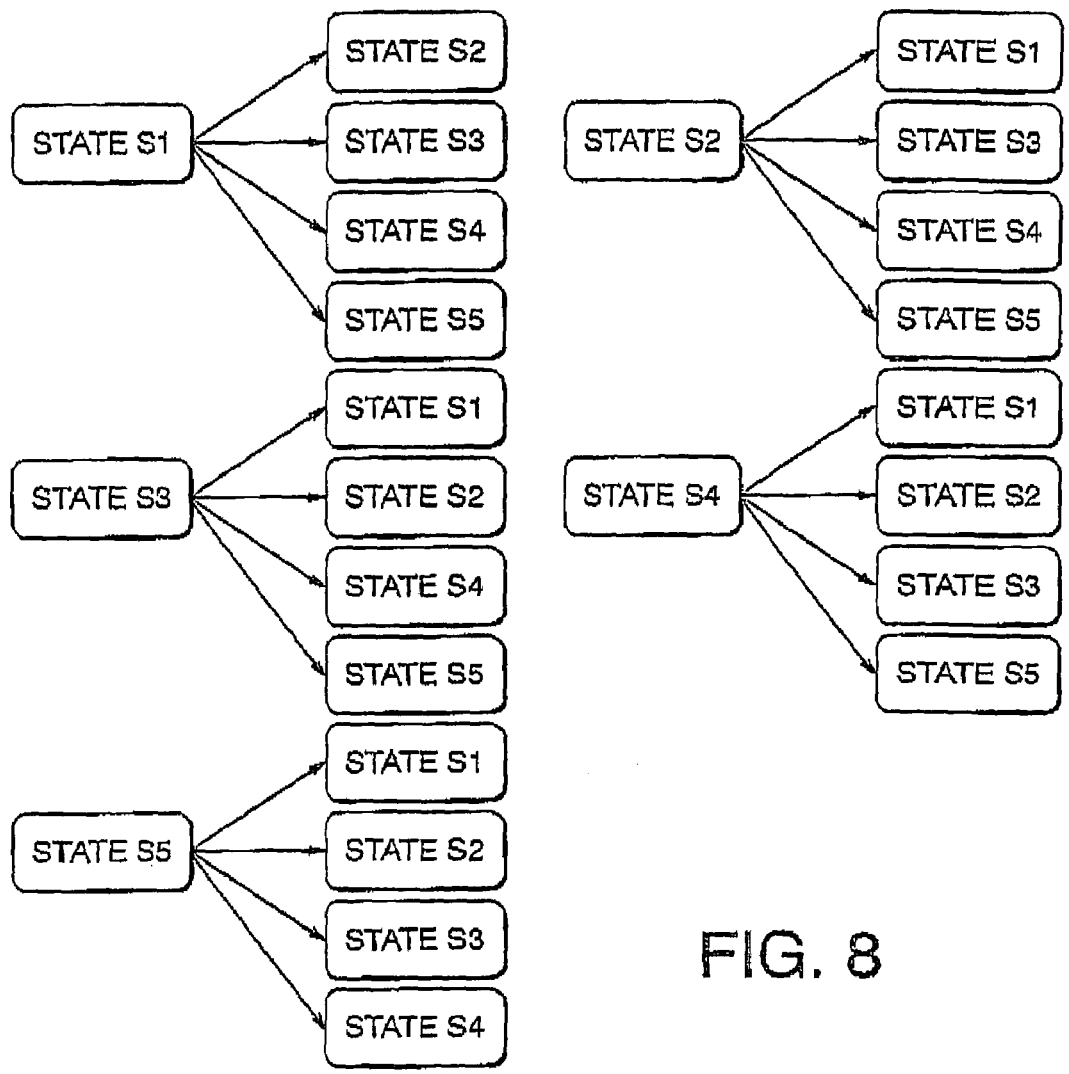
FIG. 8 is a diagram showing a state transition between states among five types of states according to a comparative example.
Figure 9:
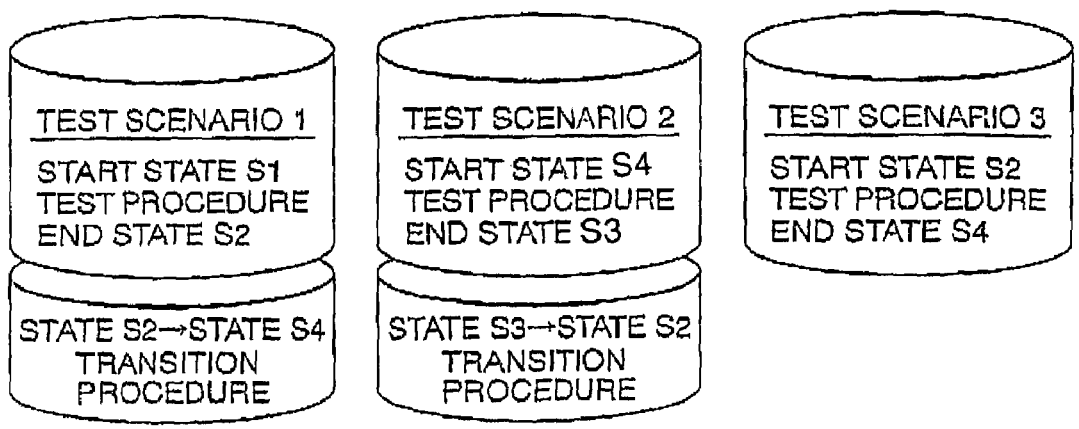
FIG. 9 is a block diagram for explaining a practically used test method.

Furthermore, referring to FIG. 8, there is shown a case where the number of states is increased from four in FIG. 7 to five. In this case, it is necessary to add new four transition procedures for transitions from the state S5 of the transition source to four states of the transition destination, namely, S1 to S4 and to add four state transition procedures for transitions from the respective states S1 to S4 of the transition source to the state S5. As a result, in the example shown in FIG. 8, it is required to define 20 state transition procedures in total. Therefore, unless the intermediate state is used, required state transition procedures increase explosively in addition to the increase in the number of states.

As stated above, it is apparent that the number of definitions of the state transition procedures can be decreased by previously defining a predetermined intermediate state in the middle of state transitions from the transition source to the transition destination as in the present invention. In addition, it is easy to change the order of executing test scenarios as in the present invention.

Naturally, the test scenarios, the intermediate state transition procedures, and the destination state transition procedures are all programs that can be executed by a computer.

While the above embodiment has been described by giving an example of a car audio system, the present invention is not limited to this, but can be applied to tests for other electronic devices including a plurality of units. In addition, the present invention is also applicable to tests for an electronic device itself.

What is claimed is:

1. A test system for conducting plural tests of a target with a computer in which the target transitions from an end state of one test to a start state of a subsequent test, the system comprising:
   a first storage device storing a plurality of test scenarios for testing the target sequentially;
   a second storage device storing a common intermediate state transition procedure in which the target is caused to transition from the end state of a first test to a common intermediate state and then the target is caused to transition from the common intermediate state to the start state of a second test that follows the first test, and in which the target is caused to transition from an end state of the second and subsequent tests to a start state of a following test by transitioning through the common intermediate state; and the computer having a central processing unit that executes the test scenarios from said first storage device and that executes the transitions through the common intermediate state from said second storage device, wherein tests are not conducted while the target is in the common intermediate state.

2. A test system for conducting plural tests of a target with a computer in which the target transitions from an end state of one test to a start state of a subsequent test, the system comprising:

a first storage device storing a plurality of test scenarios for testing the target sequentially;

a second storage device storing a common intermediate state transition procedure in which the target is caused to transition from the end state of a first test to a common intermediate state and then the target is caused to transition from the common intermediate state to the start state of a second test that follows the first test, and in which the target is caused to transition from an end state of the second and subsequent tests to a start state of a following test by transitioning through the common intermediate state; and the computer having a central processing unit that executes the test scenarios from said first storage device and that executes the transitions through the common intermediate state from said second storage device, wherein said second storage device stores respective transition data for transitions from end states of the tests to the common intermediate state, and respective transition data for transitions from the common intermediate state to start states of the tests.

3. A test system for conducting plural tests of a target with a computer in which the target transitions from an end state of one test to a start state of a subsequent test, the system comprising:

a first storage device storing a plurality of test scenarios for testing the target sequentially;

a second storage device storing a common intermediate state transition procedure in which the target is caused to transition from the end state of a first test to a common intermediate state and then the target is caused to transition from the common intermediate state to the start state of a second test that follows the first test, and in which the target is caused to transition from an end state of the second and subsequent tests to a start state of a following test by transitioning through the common intermediate state; and the computer having a central processing unit that executes the test scenarios from said first storage device and that executes the transitions through the common intermediate state from said second storage device, wherein said first storage device stores a further test scenario of a further test, and wherein said second storage device stores further transition data for a transition from an end state of the further test to the common intermediate state and stores further transition data for a transition from the common intermediate state to a start state of the further test.

* * * * *